US011333292B2

(12) United States Patent
Xiang et al.

(10) Patent No.: US 11,333,292 B2
(45) Date of Patent: May 17, 2022

(54) ELECTRIC LIFTING MEDIA WALL

(71) Applicant: Loctek Inc.

(72) Inventors: Lehong Xiang, Ningbo (CN); Linghui Jiang, Ningbo (CN); Ruizhi Wei, Ningbo (CN)

(73) Assignee: Loctek Inc, Livermore, CA (US)

( * ) Notice: Subject to any disclaimer, the term of this patent is extended or adjusted under 35 U.S.C. 154(b) by 171 days.

(21) Appl. No.: 16/520,341

(22) Filed: Jul. 23, 2019

(65) Prior Publication Data
US 2020/0347986 A1 Nov. 5, 2020

(30) Foreign Application Priority Data
May 5, 2019 (CN) .......................... 201910368377.5

(51) Int. Cl.
*F16M 11/04* (2006.01)
*F16M 11/18* (2006.01)
*F16M 11/42* (2006.01)

(52) U.S. Cl.
CPC ........... *F16M 11/046* (2013.01); *F16M 11/18* (2013.01); *F16M 11/42* (2013.01); *F16M 2200/08* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 2,861,857 | A | * | 11/1958 | Lee | A47B 83/045 312/312 |
| 5,160,104 | A | * | 11/1992 | Sher | A47B 81/064 108/96 |
| 5,797,666 | A | * | 8/1998 | Park | A47B 21/0073 312/223.3 |
| 6,095,476 | A | * | 8/2000 | Mathis | F16M 11/10 108/7 |
| 6,189,849 | B1 | * | 2/2001 | Sweere | A47B 21/0314 248/286.1 |
| 7,043,810 | B2 | * | 5/2006 | Bober | A47B 51/00 29/401.1 |
| 7,063,024 | B2 | * | 6/2006 | Latino | A47B 21/0073 108/147 |
| 7,207,278 | B2 | * | 4/2007 | Latino | A47B 21/0073 108/147 |
| 7,806,490 | B1 | * | 10/2010 | Buehl | A47B 81/064 312/312 |
| 7,854,417 | B2 | * | 12/2010 | Gan | F16M 11/10 248/161 |

(Continued)

*Primary Examiner* — Monica E Millner
(74) *Attorney, Agent, or Firm* — W&KIP (57) ABSTRACT

The present disclosure discloses an electric lifting media wall, comprising a base, a lifting component including at least one group of lifting columns with lower ends connected to the base and a drive mechanism driving the lifting columns to ascend or descend, a support frame for connection with a display mounting rack that is connected to the lifting columns and ascends or descends along with the lifting columns synchronously, and a wall shroud that shrouds outside the lifting component and the support frame. The electric lifting media wall is adjustable in height, high in bearing capability, multifunctional, convenient in assembly and disassembly, easy for later maintenance, and small in package size.

20 Claims, 9 Drawing Sheets

(56) References Cited

U.S. PATENT DOCUMENTS

| | | | | |
|---|---|---|---|---|
| 8,678,523 | B2* | 3/2014 | Carr | H04N 5/64 |
| | | | | 312/7.2 |
| 9,267,639 | B2* | 2/2016 | Sweere | F16M 11/046 |
| 10,350,748 | B2* | 7/2019 | Michael | B25H 3/04 |
| 10,432,890 | B2* | 10/2019 | Kim | H04N 5/655 |
| 10,499,729 | B1* | 12/2019 | Lavoie | A47B 9/04 |
| 2004/0090154 | A1* | 5/2004 | Chang | A47B 21/0073 |
| | | | | 312/223.3 |
| 2006/0075550 | A1* | 4/2006 | Hanson | A47B 21/0073 |
| | | | | 5/53.1 |
| 2006/0076860 | A1* | 4/2006 | Hoss | A47B 51/00 |
| | | | | 312/312 |
| 2007/0035671 | A1* | 2/2007 | Ryu | H04N 5/64 |
| | | | | 348/794 |
| 2008/0116771 | A1* | 5/2008 | Green | A47B 81/06 |
| | | | | 312/7.2 |
| 2009/0102335 | A1* | 4/2009 | Hancock | A47B 21/0073 |
| | | | | 312/223.3 |
| 2014/0001929 | A1* | 1/2014 | Remih | H05K 5/0017 |
| | | | | 312/7.2 |
| 2014/0175962 | A1* | 6/2014 | Hollenstein | A47B 51/00 |
| | | | | 312/319.5 |

* cited by examiner

ELECTRIC LIFTING MEDIA WALL

CROSS-REFERENCE TO RELATED APPLICATIONS

This application claims priority to Chinese Patent Application No. 201910368377.5 with a filing date of May 5, 2019. The content of the aforementioned application, including any intervening amendments thereto, is incorporated herein by reference.

TECHNICAL FIELD

The disclosure relates to a media wall for suspension of a display, in particular to an electric lifting medial wall.

BACKGROUND

A media wall, also known as a multimedia wall, is used for installation of multimedia equipment, and plays a great role in such numerous fields of the modern life as class teaching, and company meetings and domestic life. For example, presenting slides with a multimedia system in the multimedia wall makes teaching more visual and vivid A video conference becomes possible for a company with the help of the multimedia system in the multimedia wall. Connecting a domestic television with a multimedia system in the multimedia wall brings the convenience of videos watching. The multimedia wall is generally used for installation of equipments like displays and AD media. Traditionally, it refers to a stationary wall body where multimedia equipment such as a display, a socket, a projector and so on is mounted, and thus is incapable of satisfying requirements of users due to poor flexibility and maneuverability, particularly in offices, exhibitions, outdoor activities, and etc. Therefore, to meet requirements of users in difficult occasions, it is appropriate to design the multimedia wall of the prior art into a movable type featured by structurally comprising a base, pulleys mounted on the base, a support frame connected to the base and a display rack on the supply frame, which is movable when in use. As the Chinese patent published as CN204738391U on the website of CNIPA, discloses a movable multifunctional medial wall, which comprises a wall frame formed by enclosure of a front frame plate, a rear frame plate, a top frame plate, a bottom frame plate, a left frame plate and a right frame plate, and the lower plate surface of the bottom frame plate is provided with a movable mechanism whereby the wall frame moves. However, there are still some disadvantages in the multifunctional medial wall of the prior art in use: 1, in light of unadjustable height of the wall frame for multimedia connection, requirements of users are difficult to meet; 2, the multimedia equipment is directly connected to the wall frame with poor bearing capability, causing a poor bearing capability of the media wall, 3, with a single function of bearing multimedia equipment, the medial wall of the prior art fails to meet requirements of users, e.g., writing on a white board as required in a conference, which function however is absent in the product of the prior art, 4, it is troublesome in assembly and disassembly, low in assembly speed and poor in user experience of the media wall of the prior art as the wall frame and the plates are all connected by means of screws.

SUMMARY

The disclosure aims to overcome the foregoing defects and provide an electric lifting media wall adjustable in height, high in bearing capability, multifunctional, convenient in assembly and disassembly, easy for later maintenance, and small in package size.

The technical solution of the disclosure provides an electric lifting media wall, comprising: a base, a lifting component including at least one group of lifting columns with lower ends connected to the base and a drive mechanism driving the lifting columns to ascend or descend, a support frame for connection with a display mounting rack that is connected to the lifting columns and ascends or descends along with the lifting columns synchronously, and a wall shroud that shrouds outside the lifting component and the support frame, is connected with the lifting columns or the support frame and ascends or descends synchronously along with the lifting columns, wherein outer surfaces of two opposite side plates of the wall shroud are of planar structure; at least one outer surface includes at least one group of connecting holes through which connectors for connection with the display mounting rack penetrate the wall shroud from the outside in and then are connected with the support frame in the wall shroud.

By adopting the above structure, compared with the prior art, the electric lifting media wall of the disclosure has the following advantages that the wall shroud of the electric lifting media wall is arranged outside the lifting component and the support frame, connected with the lifting columns or the support frame, and ascends or descends along with the lifting columns synchronously. As seen from the above, the wall shroud functions as a lifting medial wall so that a display outside the wall shroud may ascend or descend along with the lifting columns synchronously, thus facilitating adjustment on lifting height of the electric lifting media wall and meeting requirements of different occasions. In addition, the display mounting rack is secured with the support frame in the wall shroud via a connector penetrating through the connecting hole of the wall shroud, endowing the display mounting rack with high bearing capability.

Preferably, the wall shroud is a square shroud formed by enclosure of a front panel, a rear panel, a left side plate, a right side plate and a top plate and provided with an open bottom and hollow inside. The connection holes are formed in the front panel. Because of the square wall shape of the wall shroud, it will shroud the lifting columns inside whilst ascending or descending, and thus brings about a generally better visual sensation of the electric lifting media wall. A plug or end cap can be arranged at the outer end of the connection hole, so when the display mounting rack is not connected, the plug or end cap would be connected to the outer end of the connection hole, in this case, the surface of the front panel becomes more flat and smooth.

Preferably, the left side plate, the right side plate and the top plate are fixedly connected into an outer frame of an inverted U shape. The front panel is fixed at the front end of the outer frame, while the rear panel is detachably connected to the rear end of the outer frame. Owing to the detachable design of the rear panel, the product is conveniently detached in later maintenance and parts replacement.

Preferably, the left and the right side plates at two sides of the rear end of the outer frame are each provided with at least one clamping base along the height direction of the outer frame. Two sides of the rear panel are respectively connected with a buckle clamped with the clamping base. The buckles on the rear panel are clamped on the clamping bases at two sides of the rear end of the outer frame from top to bottom, for connecting the rear panel to the rear end of the outer frame. As the rear panel and the outer frame are in a detachable connection structure, the rear panel is fixed only by clamping, the buckles on the clamping base from top to bottom instead of using fasteners, and reverse operation is carried out in detaching without any hand-operated tool. Therefore, assembly and disassembly are very easy and user-friendly.

Preferably, the left and right side plates at two sides of the outer frame are each provided with two parallel protruding walls transversely extending outwards. Two guide grooves that accommodate and are in sliding fit with the protruding walls are formed on inner walls at two sides of the rear panel. The lower end of the guide groove runs through the bottom of the rear panel while its upper end is a closed end. In a case that the buckles at two sides of the rear panel are clamped with the clamping bases at two sides of the outer frame, the protruding walls are accommodated in the guide grooves. On the one hand, the guide groove plays a guide role in detaching the rear panel so as to facilitate quick detaching, and on the other hand, the guide groove also can accommodate the protruding walls, so as to hidden a connection structure outside the wall shroud, thereby achieving good effect of integrity.

Preferably, when the lifting columns descend to the lowest position, the lower end of the wall shroud levels with the bottom of the base and components such as the lifting columns, the drive mechanism, the support frame, etc., could be disposed in the wall shroud Hence, during package, only a package box with the same size as the wall shroud is required, split package after detaching is omitted, in this way, the product can be put in use immediately without self assembly of a user after purchase.

Preferably, at least two groups of legs connected at the bottom of the base. Each group of legs comprises a leg stand connected with the bottom of the base and two legs rotary connected with the leg stand. Each leg has an elastic pin. A positioning hole for the free end of the elastic pin to be clamped is formed into the leg stand. When the two legs rotates to the unfolded state, elastic pins on the two legs are clamped within the positioning holes in the leg stands; When the two legs rotates to the folded state, the two legs are accommodated into a receiving groove at the bottom of the base. The folded design of the two groups of legs gives the benefits of further reducing package space of the product and favoring transportation.

Preferably, at least one side wall of the wall shroud comprises an opening communicated with the inner chamber of the wall shroud. The opening is internally in clearance fit with a writing white board with its upper and lower ends separately sliding fit on upper and lower guide rails. The upper and lower guide rails are connected onto the support frame at the inner side of the opening. The white board is capable of sliding along the upper and lower guide rails, and thus is in an expanded state or contracted state. In expanding, the white board slides outwards from the opening of the wall shroud and retracts therein in case of contracting. The arrangement of the white board endows the electric lifting media with a white board writing function. The white board can be pulled out for use in company meetings or activities and retracted into the opening after use, so as to meet working requirements of users.

Preferably, two lifting columns are disposed, each of which is connected with a drive motor. The rotary shaft of each drive motor is drive connected with a screw lifting mechanism in respective lifting column at the bottom of the drive motor. The rotary shaft of the drive motor is connected with a gear that is drive connected with a drive gear of the screw lifting mechanism, for driving the screw lifting mechanism to rotate, further driving the lifting columns to ascend or descend.

Preferably, the support frame comprises a cross beam at the upper portions of the two lifting columns, an upper stand fixed at the top of the cross beam and a lower stand fixed at the bottom of the cross beam. The drive motors at the top of the two lifting columns are respectively connected to the inner side wall of the cross beam. The outer side wall of the upper stand has a connecting base for threaded connection of the inner end of a connector at the location corresponding to the connecting hole in the wall shroud. Disposing the support frame help to improve the bearing capability of the electric lifting media wall and further expand use range, e.g., use of the electric lifting media wall is further expanded by disposing, a drawer on the support frame or mounting different stands like a projecting stand, laying a solid foundation for later technology development.

Preferably, a protection frame with an open back face sleeves the outside of the two lifting columns. Its inner wall is fixedly connected with the outer side walls of the lifting columns. The open back face of the protection frame is detachably connected with a back plate for closing or opening the open back face of the protection frame. The protection frame not only can shield the lifting columns exposed when the wall shroud ascends or descends, but also reduces noise of the lifting columns in the process of ascending or descending. The back plate at the open back face of the protection frame is detachable, so it is convenient to repair and maintain the lifting columns in the later period. There may use two protection frames respectively arranged outside the two lifting columns, namely, one protection frame is arranged outside each lifting column, as required.

Preferably, two sides of the open back face of the protection frame separately have a clamping base distributed along the height direction of the protection frame. Buckles in fit clamping with the clamping bases are connected to two sides of the back plate and are clamped with the clamping bases at two sides of the open back face of the protection frame from top to bottom, for connecting the back plate to the open back face of the protection frame and closing the open back face of the protection frame. In view of the detachable connection structure of the back plate and the protection frame, the back plate is fixed only by clamping the buckles with the clamping bases from top to bottom instead of using fasteners, and reverse operation is carried out in dismounting without any hand-operated tool. Therefore, dismounting is very convenient, and the user experience is good.

Preferably, it also comprises at least one lifting leg at the outside of the wall shroud. The top of the lifting leg is connected with a cross bar frame for table plate connection. A mounting hole for connecting with the cross bar frame can be found at the location of the wall shroud corresponding to the side of the support frame One end of the cross bar frame is fixedly connected with the mounting hole in the support frame of the wall shroud, the end of which is far away from the lifting leg. Arrangement of the lifting leg and the cross bar frame brings the benefit that the electric lifting media wall can serve as an office table. The lifting leg further comprises lifting columns and drive motors driving the lifting columns to ascend or descend. When the electric lifting media wall ascends or descends, the two lifting columns in the wall shroud and the lifting leg separately ascend or descend synchronously under the drive of respective drive motor, so as to make the table plate of the cross bar frame and the wall shroud ascend or descend synchronously.

Preferably, the clamping base comprises a connecting portion and a hooking portion in L-shaped arrangement with the connecting portion. A hanging hole extending downwards is formed in the upper end of the hooking portion. The buckle comprises an L-shaped buckle body having an inserting block portion and an inserting portion. The side wall of the inserting block portion has a stop block extending toward the inserting portion. In the case the inserting block portion of the buckle body is inserted into the hanging hole of the clamping base, the stop block abuts against the bottom wall of the hanging hole and the hooking portion outside the hanging hole is within the inserting portion of the buckle body. By virtue of the clamping base and the buckle, it is convenient to detach between the rear panel, and the left side plate, the right side plate, as well as the back plate and the protection frame, free of a tool and simple to operate.

Preferably, a plurality of rotatable pulleys are provided on the outer side wall of the protection frame. The outer edges of the pulleys fit with the inner wall of the wall shroud. The pulleys on the outer side walls of the protection frame have the beneficial effect of preventing shocking when the wall shroud ascends or descends, and thus have good lifting stability.

Preferably, at least one outer side wall of the wall shroud is provided with a suspension device for suspension of articles, which is generally selected from a group of a connection hook or a hanger column, on the outer side wall of the wall shroud, or a hanging hole in the outer side wall of the wall shroud, etc.

REFERENCE NUMERALS 1 base, 100 receiving groove; 101 leg; 102 elastic pin, 103 positioning hole, 2 lifting component, 200 lifting column; 201 drive mechanism; 3 support frame; 300 cross beam; 301 upper stand; 302 lower stand; 303 connecting base; 304 pulley; 4 display mounting rack; 5 wall shroud; 500 front panel; 501 rear panel; 502 left side plate, 503 right side plate, 504 top plate, 505 opening; 506 connecting hole; 507 guide groove, 508 suspension device, 6 white board, 600 upper guide rail; 601 lower guide rail, 7 protection frame, 700 back plate, 8 clamping base, 800 connecting portion, 801 hooking portion; 802 hanging, hole; 9 buckle; 900 inserting block portion; 901 stop block; 902 inserting portion; 10 lifting leg; 1000 cross bar frame.

EMBODIMENTS

The present disclosure will be further described below in detail with reference to the accompanying drawings and specific embodiments.

Referring to FIGS. 1-8, the disclosure provides an electric lifting media wall, comprising: a base 1, a lifting component 2 including at least one group of lifting columns 200 with lower ends connected to the base 1 and a drive mechanism 201 driving the lifting columns 200 to ascend and descend, a support frame 3 for connection with a display mounting rack 4 that is connected to the lifting column 200 and ascends or descends along with the lifting columns 200 synchronously, a wall shroud 5 that shrouds outside the lifting component 2 and the support frame 3, is connected with the lifting columns 200 or the support frame and ascends or descends synchronously along with the lifting columns 200, wherein outer surfaces of two opposite side plates of the wall shroud 5 are of planar structure; at least one outer surface includes at least one group of connecting holes 506 into which connectors for connection with the display mounting rack 4 penetrate the wall shroud 5 from the outside in and then are connected with the support frame 3 in the wall shroud 5. The wall shroud 5 of the electric lifting media wall is arranged outside the lifting component 2 and the support frame 3, connected with the lifting columns 200 or the support frame 3, and ascends or descends along with the lifting columns 200 synchronously. As can be seen from the above, the wall shroud 5 functions as a lifting medial wall, such that a display outside the wall shroud 5 will ascend or descend along with the lifting columns 200 synchronously, thus facilitating adjustment on lifting height of the electric lifting media wall and meeting requirements of different occasions. In addition, the display mounting rack 4 is secured with the support frame 3 in the wall shroud 5 via a connector penetrating through the connecting hole 506 of the wall shroud 5, endowing the display mounting rack 4 with high bearing capability. The wall shroud 5 below the display mount bracket 4 is connected with a supporting plate where a mouse, a keypad and the like can be placed.

Further referring to FIGS. 1, 2, 4 and 5, the wall shroud 5 is a square shroud formed by enclosure of a front panel 500, a rear panel 501, a left side plate 502, a right side plate 503 and a top plate 504 and provided with an open bottom, and hollow inside. The top plate 504 of the wall shroud 5 is secured with the top of the support frame 3. The connection holes 506 are formed in the front panel 500. The top plate 504 is joined to the support frame 3 via a screw penetrating through a hole in the top plate 504 and a threaded hole in the top of the support frame 503 from top to bottom. Because of the square wall shape of the wall shroud 5, it can shroud the lifting columns 200 inside whilst ascending or descending, and thus brings about good whole visual sensation to the electric lifting media wall.

The left side plate 502, the right side plate 503 and the top plate 504 are fixedly connected into an outer frame of an inverted U shape. The front panel 500 is fixedly connected at the front end of the outer frame, and the rear panel 501 is detachably connected to the rear end of the outer frame. The left side plate 502, the right side plate 503 and the top plate 504 are joined into a U-shaped outer frame via a connection board. The front panel 500 is fixed at the front end of the outer frame via screws. The detachable design of the rear panel 501 causes the product to be conveniently detached in later maintenance and parts replacement.

The left side plate 502 and the right side plate 503 at two sides of the outer frame are each provided with at least one clamping base 8 along the height direction of the outer frame. Two sides of the rear panel 504 are respectively connected with a buckle 9 clamped with the clamping base 8. The buckles 9 on the rear panel 501 are clamped on the clamping bases 8 at two sides of the rear end of the outer frame from top to bottom, for connecting the rear panel 501 to the rear end of the outer frame. The rear panel 501 and the outer frame are in a detachable connection structure, so the rear panel 501 is fixed only by clamping the buckles 9 on the clamping base 8 from top to bottom instead of using fasteners, and reverse operation is carried out in detaching without any hand-operated tool. Therefore, assembly and disassembly are very easy and user experience is good.

Figure 5:
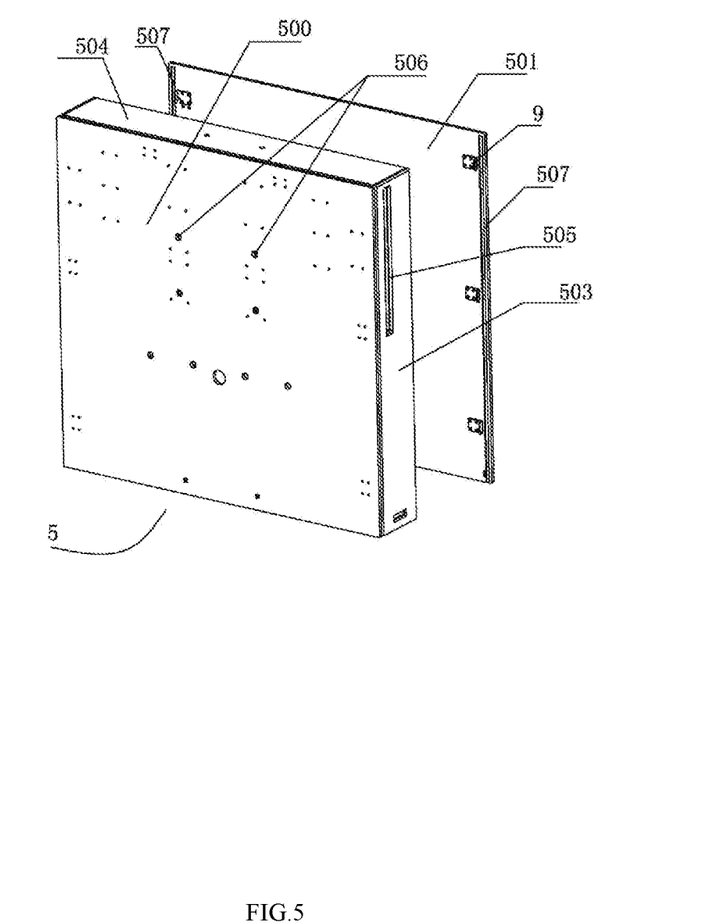
FIG. 5 is a schematic diagram of the connection structure of the wall shroud of the electric lifting media wall of the present disclosure.

Further referring to FIG. 5, the left side plate 502 and the right side plate 503 at two sides of the outer frame are each provided with, two parallel protruding walls transversely extending outwards. Two guide grooves 507 that accommodate and are in sliding fit with the protruding walls are arranged on inner walls at two sides of the rear panel 501. The lower end of the guide groove 507 runs through the bottom of the rear panel 501 while its upper end is a closed end. In a case that the buckles 9 at two sides of the rear panel 501 are clamped with the clamping bases 8 at two sides of the outer frame, the protruding walls are accommodated in the guide grooves 507. On the one hand, the guide groove 507 plays a guide role in detaching the rear panel 501 so as to facilitate quick dismounting, and on the other hand, the guide groove may also accommodate the protruding walls, so as to hide the connection structure outside the wall shroud 5, thereby achieving good integrity.

When the lifting columns 200 descend to the lowest position, the lower end of the wall shroud 5 levels with the bottom of the base 1 and components such as the lifting column 200, the drive mechanism 201, the support frame 3, etc., can be disposed in the wall shroud 5. Hence, during package, a package box with the same size as the wall shroud 5 is only required, split package after detaching is omitted, in this way, the product can be immediately put in use without self assembly of a user after purchase.

Figure 1:
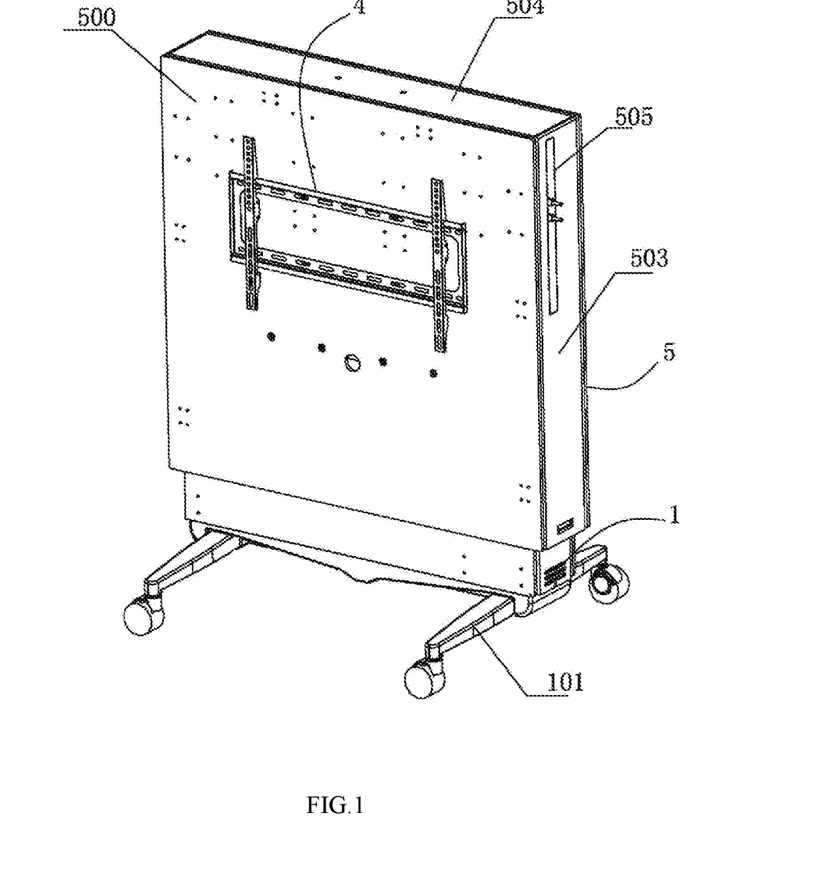
FIG. 1 is a schematic diagram of the front structure of the electric lifting media wall of the present disclosure.
Figure 2:
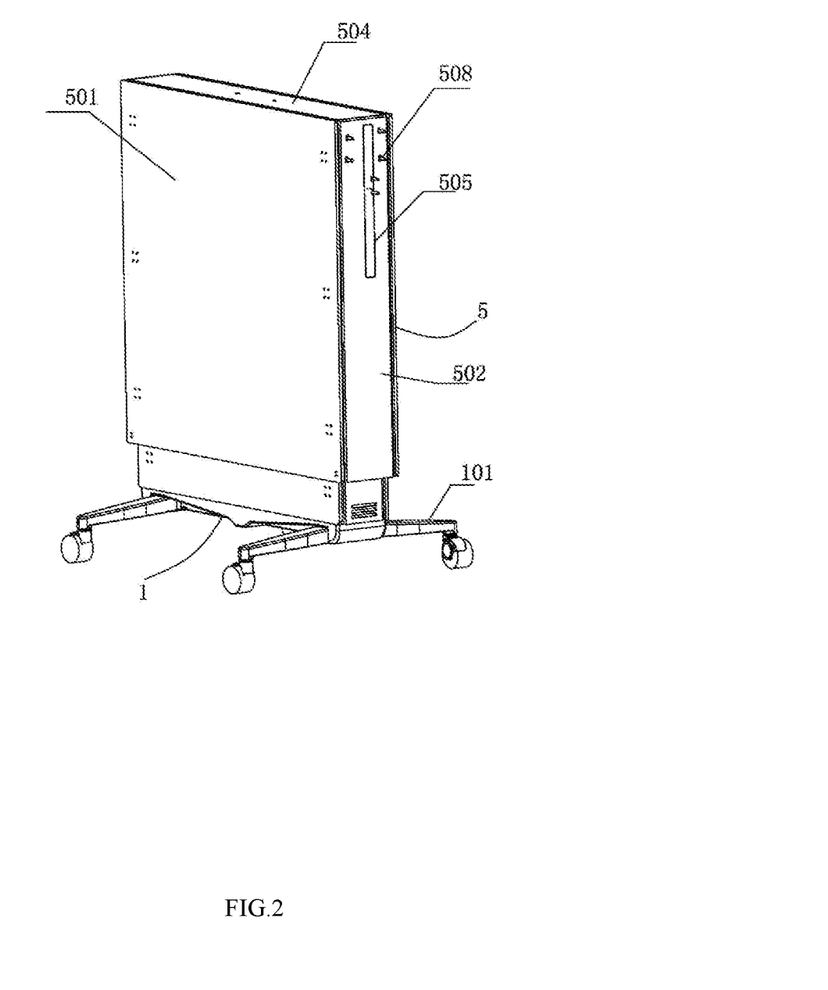
FIG. 2 is a schematic diagram of the rear structure of the electric lifting media wall of the present disclosure.
Figure 3:
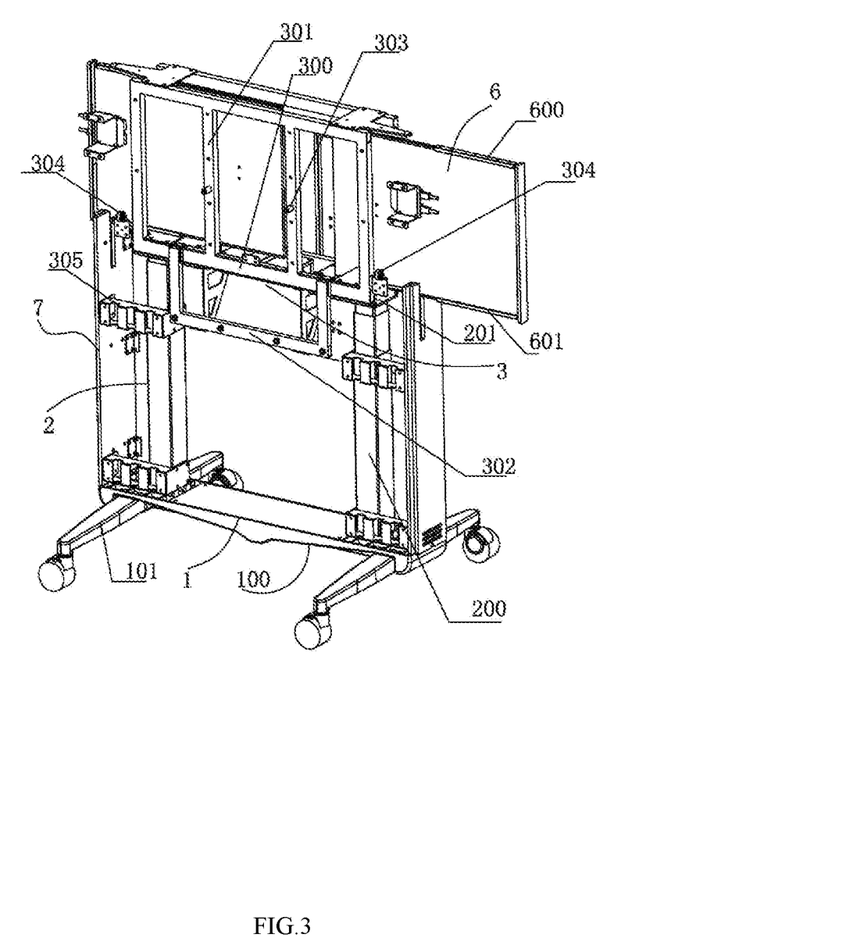
FIG. 3 is a schematic diagram of the inner structure of the electric lifting media wall of the present disclosure.
Figure 6:
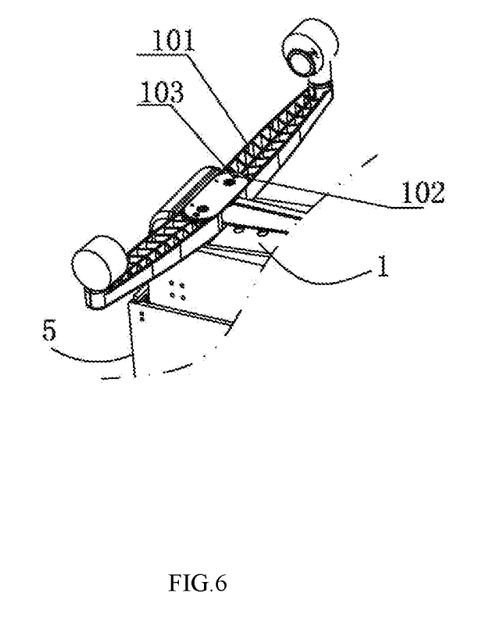
FIG. 6 is a schematic diagram of the connection structure of the legs of the base of the electric lifting media wall of the present disclosure.

Referring to FIGS. 1 and 6, there are two groups of legs 101 connected to the bottom of the base 1. Each group of legs 101 comprises a leg stand 101 connected to the bottom of the base 1 and two legs 101 rotary connected with the leg stand. Each leg 101 has an elastic pin 102. A positioning hole 103 for the free end of the elastic pin 102 to be clamped is formed into the leg stand. In case of rotating to the unfolded state, elastic pins 102 on the two legs 101 are clamped within the positioning holes 103 in the leg stands, if rotating to the folded state, the two legs 101 are accommodated into the receiving groove 100 at the bottom of the base 1.

Figure 4:
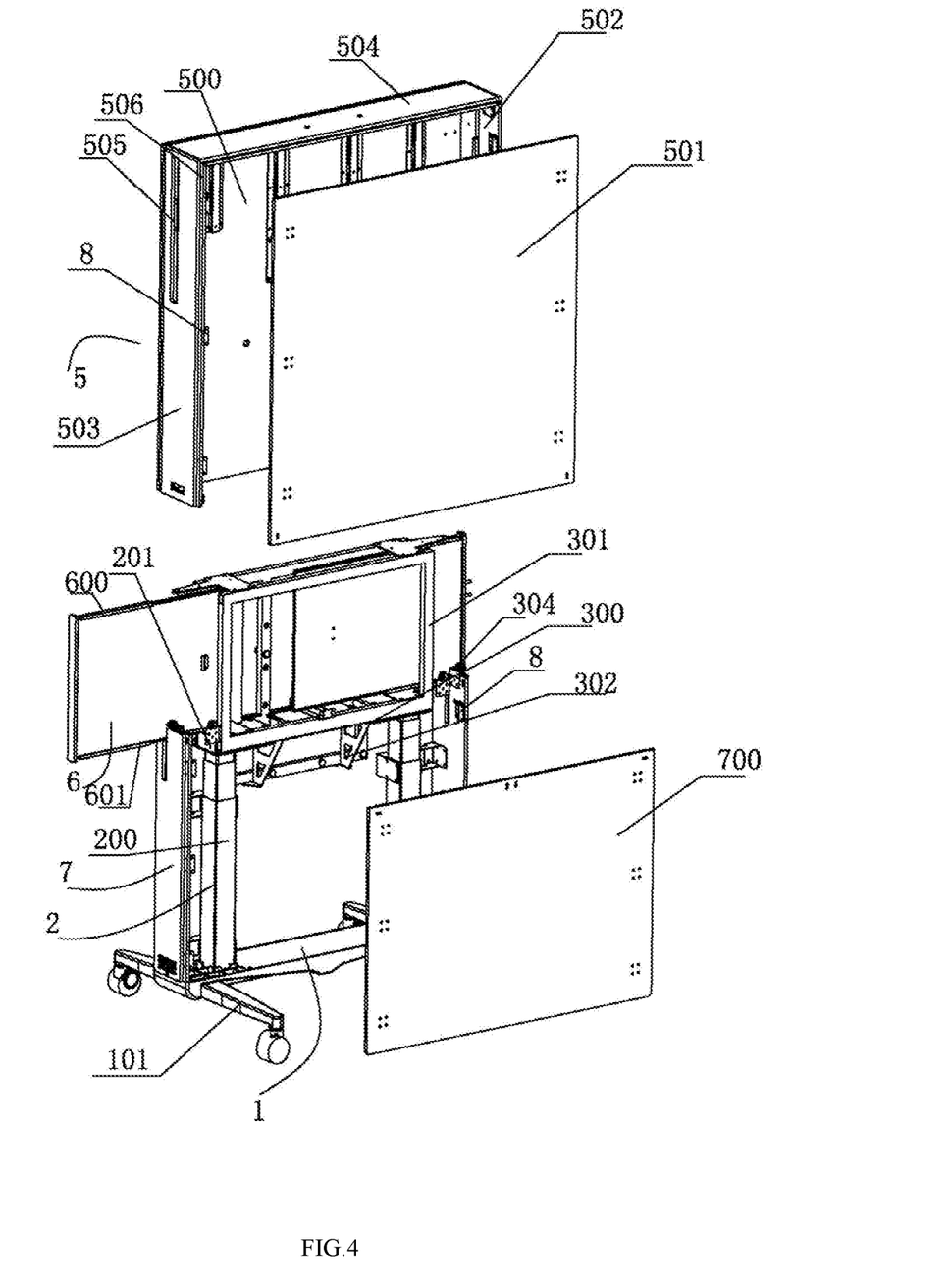
FIG. 4 is a schematic diagram of the assembled structure of the electric lifting media wall of the present disclosure.

Referring to FIG. 4, at least one side wall of the wall shroud 5 comprises an opening 505 communicated with the inner chamber of the wall shroud 5. The opening 505 is internally in clearance fit with a writing white board 6 with its upper end sliding fit on an upper guide rail 600 and lower end sliding fit on a lower guide rail 601. The upper and lower guide rails 600, 601 are connected onto the support frame 3 at the inner side of the opening 505. The white board 6 is capable of sliding along the upper and lower guide rails 600, 601, and thus is in an expanded or contracted state. In expanding, the white board 6 slides outwards from the opening 505 of the wall shroud 5 and retracts therein in case of contracting. Disposing the white board 6 provides the electric lifting media wall with a white board writing function. The white board 6 can be pulled out for use in company meetings or activities and retracted into the opening 505 after use, so as to meet working requirements of people.

Two lifting columns 200 are disposed, each one of which is connected with a drive motor. The rotary shaft of each drive motor is drive connected with a screw lifting mechanism in respective lifting column 200 at the bottom of the drive motor. The drive motor in the disclosure is connected to the top end of the lifting column. The lifting mechanism is generally a screw type. The lifting column 200 is formed by nested sliding of a plurality of sleeves. The screw lifting mechanism is located in the central hole of the inner sleeve. There will provide no detailed explanation about the lifting mechanism in the disclosure, and more information about the screw lifting mechanism may be disclosed in the Chinese patent application with publication No. CN108741625A.

The support frame comprises a cross beam 300 at the upper portions of the two lifting columns 200, as well as an upper stand 301 and a lower stand 302 separately fixed at the top and bottom of the cross beam 300. The drive motors at the top of the two lifting columns 200 are respectively connected to the inner side wall of the cross beam 300. The outer side wall of the upper stand 301 has a connecting base 303 for threaded connection of the inner end of a connector at the location corresponding to the connecting hole 506 in the wall shroud 5. The support frame 3 has the benefits of improving the bearing capability of the electric lifting media wall and further expanding use range, e.g., use of the electric lifting media wall is further expanded by disposing a drawer on the support frame 3 or mounting different stands like a projecting stand, laying a solid foundation for later technology development.

Further referring to FIG. 4, a protection frame 7 with an open back face sleeves the outside of the two lifting columns 200. The inner wall of the protection frame 7 is fixedly connected with the outer side walls of the lifting columns 200. The open back face of the protection frame 7 is detachably connected with a back plate 700 for closing or opening the open back face of the protection frame 7.

Two sides of the open back face of the protection frame 7 are separately provided with a clamping base 8 distributed along the height direction of the protection frame 7. Buckles 9 in fit clamping with the clamping bases 8 are connected to two sides of the back plate 700 and are clamped with the clamping bases 8 at two sides of the open back face of the protection frame 7 from top to bottom, for connecting the back plate 700 to the open back face of the protection frame 7 and closing the open back face of the protection frame 7. The protection frame 7 not only can shield the lifting columns 200 exposed when the wall shroud 5 ascends or descends, but also reduces noise of the lifting columns 200 in the process of ascending or descending. The back plate 700 at the open back face of the protection frame 7 is detachable, so it is convenient to repair and maintain, the lifting columns 200 in the later period. There may use two protection frames 7 respectively arranged outside the two lifting columns 200, namely, one protection frame 7 is arranged outside each lifting column 200, as required.

Figure 7:
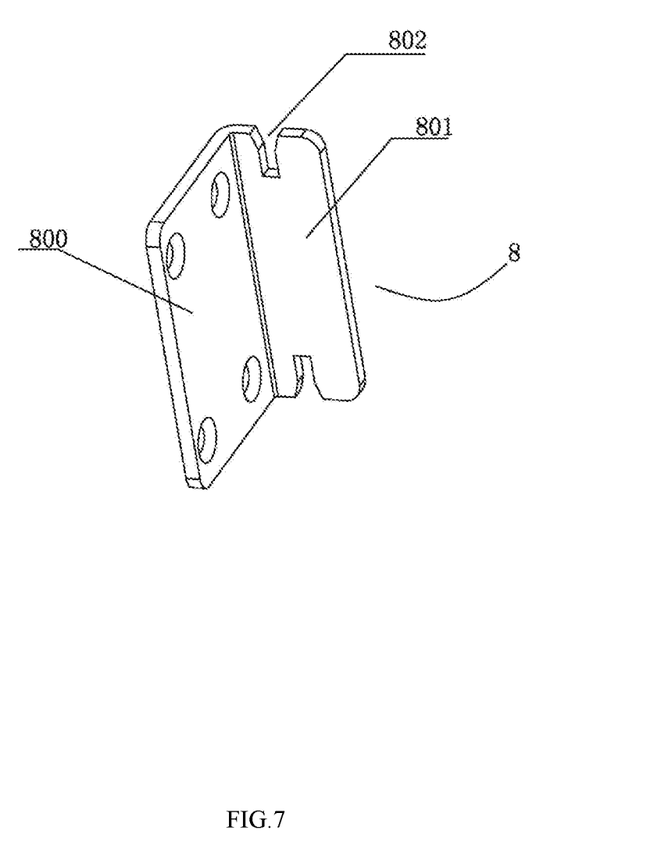
FIG. 7 is a schematic diagram of the connection structure of the clamping base of the electric lifting media wall of the present disclosure.
Figure 8:
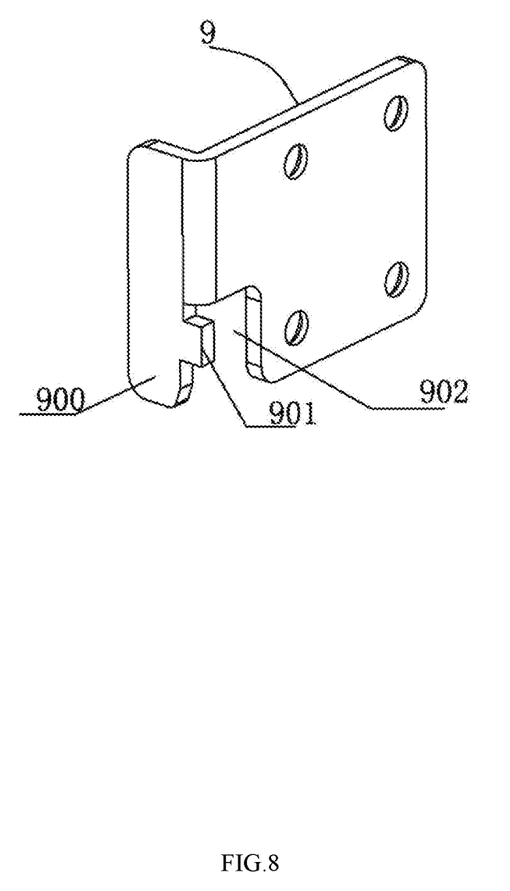
FIG. 8 is a schematic structure diagram of the buckle of the electric lifting media wall of the present disclosure.

Further referring to FIGS. 7 and 8, the clamping base 8 comprises a connecting portion 800 and a hooking portion 801 forming an L shape with the connecting portion 800. A hanging hole 802 extending downwards is formed in the upper end of the hooking portion 801. The buckle 9 comprises an L-shaped buckle body having an inserting block portion 900 and an inserting portion 902. The side wall of the inserting block portion 900 has a stop block 901 extending toward the inserting portion 902. When the inserting block portion 901 of the buckle body is inserted into the hanging hole 802 of the clamping base 8, the stop block 901 abuts against the bottom wall of the hanging hole 802 and the hooking portion 801 outside the hanging hole 802 is located within the inserting portion 902 of the buckle body. Both the connecting portion 800 and the buckle body have four holes through which the two are fixed via screws. By virtue of the clamping base 8 and the buckle 9, it is convenient to detach the rear panel 501 from the left side plate 502, the right side plate 503, the back plate 700 and the protection frame 7, free of a tool and simple to operate.

A plurality of rotatable pulleys 304 are provided on the outer side wall of the protection frame 7. The outer edges of the pulleys 304 fit the inner wall of the wall shroud 5. The pulleys 304 on the outer side walls of the protection frame 7 play a role in preventing shocking when the wall shroud 5 ascends or descends, thereby having good lifting stability.

Figure 9:
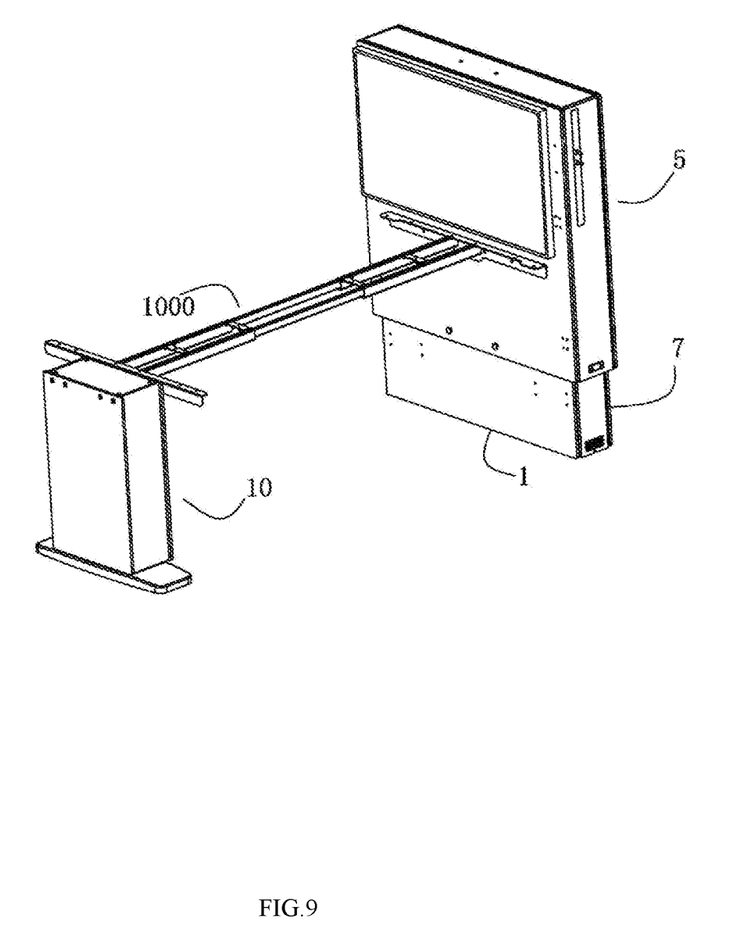
FIG. 9 is a schematic diagram of connection of the electric lifting media wall, the lifting leg and the cross bar frame of the present disclosure.

Referring to FIG. 9, it also comprises at least one lifting leg 10 outside the wall shroud 5. The top of the lifting leg 10 is connected with a cross bar frame 1000 for table plate connection. A mounting hole for connecting with the cross bar frame 1000 can be found at the location of the wall shroud 5 corresponding to the side of the support frame 3. One end away from the lifting leg 10 of the cross bar frame 1000 is fixedly connected with the support frame 3 in the wall shroud 5. By virtue of the lifting leg and the cross bar frame, the electric lifting media wall may serve as an, office table. The lifting leg further comprises lifting columns and drive motors driving the lifting columns to ascend or descend. The drive motor drives the screw lifting mechanism in the lifting column to act so as to drive the lifting column to ascend or descend. When the electric lifting media wall ascends or descends, the two lifting columns 200 in the wall shroud 5 and the lifting leg separately ascend or descend synchronously under the drive of respective drive motor, so as to make the table plate of the cross bar frame and the wall shroud 5 ascend or descend synchronously.

At least one outer side wall of the wall shroud 5 is provided with a suspension device 508 for suspension of articles. The suspension device 508 may be selected from a group of a connection hook or a hanger column on the outer side wall of the wall shroud, or a hanging hole in the outer side wall of the wall shroud, etc.

In conclusion, the aforementioned embodiments are merely specific implementation modes of the present disclosure, and the present disclosure is not limited thereto. For a person of ordinary skill in the art, any variations or substitutions made without departing from the disclosure of the present disclosure should be regarded as falling into the protection scope of the present disclosure. Therefore, the appended claims should prevail over the protection scope of the present disclosure.

We claim:

1. An electric lifting media wall, comprising:
   a base,
   a lifting component including at least one group of lifting columns with lower ends connected to the base and a drive mechanism driving the lifting columns to ascend or descend,
   a support frame for connection with a display mounting rack that is connected to the lifting columns and ascends or descends along with the lifting columns synchronously, and
   a wall shroud comprising two opposite side plates, wherein each side plate comprises an outer surface; the wall shroud shrouds outside the lifting component and the support frame, is connected with the lifting columns or the support frame and ascends or descends synchronously along with the lifting columns, the outer surfaces of the two opposite side plates of the wall shroud are of planar structure; at least one outer surface includes at least one group of connecting holes through which connectors for connection with the display mounting rack penetrate the wall shroud and then are connected with the support frame in the wall shroud.

2. The electric lifting media wall of claim 1, wherein the wall shroud is a square shroud formed by enclosure of a front panel, a rear panel, a left side plate, a right side plate and a top plate and provided with an open bottom and hollow inside, and the connection holes are formed in the front panel.

3. The electric lifting media wall of claim 2, wherein the left side plate, the right side plate and the top plate are fixedly connected into an outer frame of an inverted U shape, the front panel is fixed at a front end of the outer frame, and a rear panel is detachably connected to the rear end of the outer frame.

4. The electric lifting media wall of claim 3, wherein the left and the right side plates at two sides of the rear end of the outer frame are each provided with at least one clamping base along the height direction of the outer frame; two sides of the rear panel are respectively connected with a buckle clamped with the clamping base; the buckles on the rear panel are clamped on the clamping bases at two sides of the rear end of the outer frame from top to bottom, for connecting the rear panel to the rear end of the outer frame.

5. The electric lifting media wall of claim 4, wherein the left and right side plates at two sides of the outer frame are each provided with two parallel protruding walls transversely extending outwards; the two guide grooves that accommodate and are in sliding fit with the protruding walls are formed on inner walls at two sides of the rear panel; the lower end of the guide groove runs through the bottom of the rear panel while its upper end is a closed end; In a case that the buckles at two sides of the rear panel are clamped with the clamping bases at two sides of the outer frame, the protruding walls are accommodated in the guide grooves.

6. The electric lifting media wall of claim 1, wherein the lower end of the wall shroud levels with the bottom of the base when the lifting columns descend to the lowest position.

7. The electric lifting media wall of claim 1, wherein at least two groups of legs connected at the bottom of the base; each group of legs comprises a leg stand connected with the bottom of the base and two legs rotary connected with the leg stand; each leg has an elastic pin; a positioning hole for the free end of the elastic pin to be clamped is formed into the leg stand; when the two legs rotates to the unfolded state, the elastic pins on the two legs are clamped within the positioning holes in the leg stands; when the two legs rotates to the folded state, the two legs are accommodated into a receiving groove at the bottom of the base.

8. The electric lifting media wall of claim 1, wherein at least one side wall of the wall shroud comprises an opening communicated with the inner chamber of the wall shroud; the opening is internally in clearance fit with a writing white board with its upper and lower ends separately sliding fit on an upper guide rail and a lower guide rail; the upper and lower guide rails are connected onto the support frame at the inner side of the opening; the white board is capable of sliding along the upper and lower guide rails, and thus is in an expanded state or contracted state; in expanding, the white board slides outwards from the opening of the wall shroud and retracts therein in case of contracting.

9. The electric lifting media wall of claim 1, wherein it comprises two lifting columns, each of which is connected with a drive motor; the rotary shaft of each drive motor is drive connected with a screw lifting mechanism in respective lifting column at the bottom of the drive motor.

10. The electric lifting media wall of claim 9, wherein the support frame comprises a cross beam at the upper portions of the two lifting columns, an upper stand fixed at the top of the cross beam and a lower stand fixed at the bottom of the cross beam; the drive motors at the top of the two lifting columns are respectively connected to the inner side wall of the cross beam; the outer side wall of the upper stand has a connecting base for threaded connection of the inner end of a connector at the location corresponding to the connecting hole in the wall shroud.

11. The electric lifting media wall of claim 9, wherein a protection frame with an open back face sleeves the outside of the two lifting columns; its inner wall is fixedly connected with the outer side walls of the lifting columns; the open back face of the protection frame is detachably connected with a back plate for closing or opening the open back face of the protection frame.

12. The electric lifting media wall of claim 11, wherein two sides of the open back face of the protection frame separately have a clamping base distributed along the height direction of the protection frame; buckles in fit clamping with the clamping bases are connected to two sides of the back plate and are clamped with the clamping bases at two sides of the open back face of the protection frame from top to bottom, for connecting the back plate to the open back face of the protection frame and closing the open back face of the protection frame.

13. The electric lifting media wall of claim 1, wherein at least one lifting leg at the outside of the wall shroud; the top of the lifting leg is connected with a cross bar frame for table plate connection; a mounting hole for connecting with the cross bar frame can be found at the location of the wall shroud corresponding to the side of the support frame; one end of the cross bar frame is fixedly connected with the mounting hole in the support frame of the wall shroud, the end of which far away from the lifting leg.

14. The electric lifting media wall of claim 4, wherein the clamping base comprises a connecting portion and a hooking portion in L-shaped arrangement with the connecting portion; a hanging hole extending downwards is formed in the upper end of the hooking portion; the buckle comprises an L-shaped buckle body having an inserting block portion and an inserting portion; the side wall of the inserting block portion has a stop block extending toward the inserting portion; when the inserting block portion of the buckle body is inserted into the hanging hole of the clamping base, the stop block abuts against the bottom wall of the hanging hole and the hooking portion outside the hanging hole is within the inserting portion of the buckle body.

15. The electric lifting media wall of claim 11, wherein a plurality of rotatable pulleys are provided on the outer side wall of the protection frame; the outer edges of the pulleys fit with the inner wall of the wall shroud.

16. The electric lifting media wall of claim 1, wherein at least one outer side wall of the wall shroud is provided with a suspension device for suspension of articles.

17. The electric lifting media wall of claim 2, wherein the lower end of the wall shroud levels with the bottom of the base when the lifting columns descend to the lowest position.

18. The electric lifting media wall of claim 3, wherein the lower end of the wall shroud levels with the bottom of the base when the lifting columns descend to the lowest position.

19. The electric lifting media wall of claim 4, wherein the lower end of the wall shroud levels with the bottom of the base when the lifting columns descend to the lowest position.

20. The electric lifting media wall of claim 5, wherein the lower end of the wall shroud levels with the bottom of the base when the lifting columns descend to the lowest position.

* * * * *